United States Patent
Garbe

(10) Patent No.: US 7,775,606 B2
(45) Date of Patent: Aug. 17, 2010

(54) MOTOR VEHICLE BRAKE POWER PROPORTIONING METHOD AND DEVICE WITH AN ELASTIC ELEMENT

(75) Inventor: Thomas Garbe, Affalterbach (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/038,397

(22) Filed: Feb. 27, 2008

(65) Prior Publication Data
US 2008/0210503 A1    Sep. 4, 2008

(30) Foreign Application Priority Data
Mar. 2, 2007    (DE) ...................... 10 2007 010 200

(51) Int. Cl.
*B60T 13/00*    (2006.01)
(52) U.S. Cl. ..................................... 303/9.62; 303/9.75
(58) Field of Classification Search ......... 188/345–358; 60/549, 581; 303/9.69–9.71, 9.62, 9.75
See application file for complete search history.

(56) References Cited

U.S. PATENT DOCUMENTS

| | | | | |
|---|---|---|---|---|
| 1,822,900 A | * | 9/1931 | Messier | 244/235 |
| 1,953,057 A | * | 3/1934 | Sorensen | 188/357 |
| 3,442,557 A | * | 5/1969 | Oberthur | 303/9.69 |
| 3,978,669 A | * | 9/1976 | Belart | 60/549 |
| 4,489,989 A | * | 12/1984 | Belart et al. | 303/122.13 |
| 5,070,699 A | * | 12/1991 | Leiber et al. | 60/581 |

FOREIGN PATENT DOCUMENTS

| | | |
|---|---|---|
| DE | 11 19 136 | 12/1961 |
| DE | 25 23 061 A1 | 12/1976 |
| GB | 1 553 882 | 10/1979 |

* cited by examiner

*Primary Examiner*—Christopher P Schwartz
(74) *Attorney, Agent, or Firm*—Gerald E. Hespos; Michael J. Porco

(57) ABSTRACT

A motor vehicle brake power proportioning device has a brake control force proportioned by a balance-beam-type device at a variable ratio onto different brake cylinders, particularly to the master brake cylinders of the front and rear axle of the motor vehicle. The balance-beam-type device is configured so that a lever arm adjustment, that is continuously a function of the brake control force, can be achieved for a constant course of the proportioning of the brake control force onto the brake cylinders. For achieving the lever arm adjustment as a function of the brake control force, at least one section of the balance-beam-type device is continuously deformable as a function of the brake control force.

8 Claims, 2 Drawing Sheets

MOTOR VEHICLE BRAKE POWER PROPORTIONING METHOD AND DEVICE WITH AN ELASTIC ELEMENT

BACKGROUND AND SUMMARY OF THE INVENTION

The present invention relates to a brake power proportioning device for a motor vehicle, to an elastic element for a brake power proportioning device and to a corresponding vehicle.

For proportioning the brake control force between the master brake cylinders of the front axle and rear axle, a balance beam is normally used in the motor vehicle. The brake control force is therefore proportioned at the inverse ratio of the lever arms of the balancing beam onto the master brake cylinders. In this case, adjusting this ratio as a function of the loading of the motor vehicle is already known. The adjustment is carried out, for example, after the loading of the motor vehicle.

During a braking operation, however, the wheel load proportioning between the front and rear axle is dynamic, whereby the ideal brake power proportioning describes a parabola, whereas the brake load proportioning adjusted by a balance beam represents a straight line. The brake power proportioning is therefore normally adjusted for a value close to the maximally obtainable deceleration during a braking operation. For this reason, at the start of the braking operation and until the maximal deceleration has been reached, one axle, normally the rear axle, does not optimally participate in the deceleration of the motor vehicle. The result is a lengthening of the braking distance.

DE 25 23 061 A1 describes a brake power proportioning device for a motor vehicle where the brake control force is proportioned by a balance-beam-like device at a variable ratio onto the master brake cylinders of the front and rear axle of the motor vehicle. The balance-beam-type device is configured so that a lever arm adjustment, which adjustment is continuously a function of the brake control force, can be achieved for a constant course of the braking power proportioning onto the master brake cylinders. For this purpose, the balancing-beam-type device is provided as an unstably disposed, dimensionally stable triangle of forces. When a braking operation is initiated, existing elasticities and/or idle paths of the braking system result in an unequal proportioning of the brake control force onto the two master brake cylinders. When the brake control force is increased, the unstable bearing will then result in an increasing inequality of the proportioning of the brake control force. For implementing this solution, however, complicated restricted guiding devices are required in the case of the braking system as well as braking systems that are not ideal or have a special construction for providing a respective elasticity or idle path. Also, such restricted guiding devices generate additional friction and require additional space in the motor vehicle.

DE 11 19 136 describes a brake power proportioning device with a spring elastic. When a certain brake control force is exceeded, a discontinuous change, that is, a jump, is achieved by a high-expenditure lever system when the braking power is proportioned onto the two master brake cylinders.

An object of the present invention is to provide a motor vehicle brake power proportioning device that provides a continuous lever arm adjustment as a function of the brake control force, has a simple construction and can be used for arbitrary pressure-type braking systems.

According to the invention, it is provided that, for achieving the lever arm adjustment as a function of the brake control force, at least one section of the balance-beam-type device is constructed to be continuously deformable as a function of the brake control force. As a result of the use of the element according to the invention, which can be deformed as a function of the brake control force, a lever arm adjustment of the balance-beam-type device, which is continuously a function of the brake control force, for arbitrary pressure-type braking systems in the motor vehicle can take place.

In other words, the present invention utilizes no strengthening of already existing instabilities or elasticities of an existing braking system but provides the latter itself by way of an element that can be deformed as a function of the brake control force. In particular, the braking system can have an ideally stiff construction with respect to the brake pedal travel i.e., the idle path and the volume incorporation. A special construction of the braking system is also not required. Particularly, no restrictions exist with respect to used diameters of hydraulic cylinders or other components. A particularly simple and cost-effective implementation is achieved because of the elimination of additional restricted guiding devices with their friction and space requirement.

A particularly preferred embodiment of the invention provides that the balance-beam-type device is constructed as a triangle of forces (also referred to hereinafter as a force triangle), at least one leg of the triangle of forces comprising an element of a defined elasticity. Such elements of a defined elasticity are, for example, springs, gas or elastomers. These elements are selected so that they have an elasticity which is defined under the normal operating loads of the braking system and is significant. Because of the resulting longitudinal change of the at least one leg of the triangle of forces, the ratio of the lever arms and thereby the brake load or power proportioning onto the main brake cylinders is changed. The selection of the geometry of the triangle of forces—that is, the leg lengths and angles, and the stiffness of the element of a defined elasticity (elastic element) achieves an individual adjustment of the brake power proportioning by way of the brake control force. An approximation to an ideal brake load or power proportioning can thereby be represented.

The present invention now achieves for the first time a control of arbitrary braking systems that continuously is a function of the brake control force. A strengthening of material-caused elasticities of components, such as tubes, is therefore no longer necessary. The reason is that the design of a braking system is aimed at minimizing as much as possible specifically these material-caused elasticities. Elasticity in pressure-transmitting components means additional volume incorporation, while elasticity in power-transmitting components indicates an additional path to be covered. Both of these effects lead, however, to a more indirect feeling at the brake pedal with a less precise pressure point, and that is undesirable during a brake application.

With the present invention, a particularly simple construction of a brake load or power proportioning is obtained for a constant brake control force proportioning distribution to the wheel brake cylinders. By the selection of a suitable elastic material, for example, progressive, decreasing or a combination thereof, brake load distributions can be implemented with an arbitrarily definable course. In particular, an adaptation can also take place to a braking system in which the elastic element is under tension for controlling pulled wheel brake cylinders, or in which the elastic element is subject to compression, for controlling pressed wheel brake cylinders.

In an advantageous further development of the invention, a damping member is additionally assigned to the elastic element for the time-delayed application of the brake control force. The background is that, at the moment of the starting braking operation, the ideal brake power proportioning corresponds to the static ratio of the axle loads of a stationary motor vehicle. This is based on the circumstance that a direct proportionality exists between the brake pressure and the static acceleration (change of speed) of the motor vehicle. However, as a result of the acceleration of the vehicle, a dynamic wheel load distribution takes place. At the start of the acceleration operation, the motor vehicle is therefore in a non-static condition, whereby the applied brake pressure "precedes" the actual acceleration. For the time period of a time variation, the defined brake load (power) proportioning therefore does not correspond to the actual acceleration forces transmitted by the axles. Particularly at the start of the braking operation, the rear axle of the motor vehicle could make a higher contribution to the overall deceleration of the vehicle than is triggered by the present system. This can be taken into account by a delay of the adjustment of the brake power proportioning; i.e., by the use of a damping member parallel to the elastic element. This damping member can be adapted individually to vehicle dynamics. In other words, in addition to the brake load proportioning which is a function of the power, a component is used which is dependent on the control speed.

Preferably, the elastic element and/or the damping member are provided to be exchangeable. This permits an individual adaptation to a respectively predefined configuration of the motor vehicle. An exchange is particularly easy if the elastic element is constructed in one piece together with the damping member.

BRIEF DESCRIPTION OF THE DRAWINGS

The invention will now be described in detail by means of a drawing which illustrates two particularly preferred embodiments of the invention.

DETAILED DESCRIPTION OF THE DRAWINGS

Figure 1:
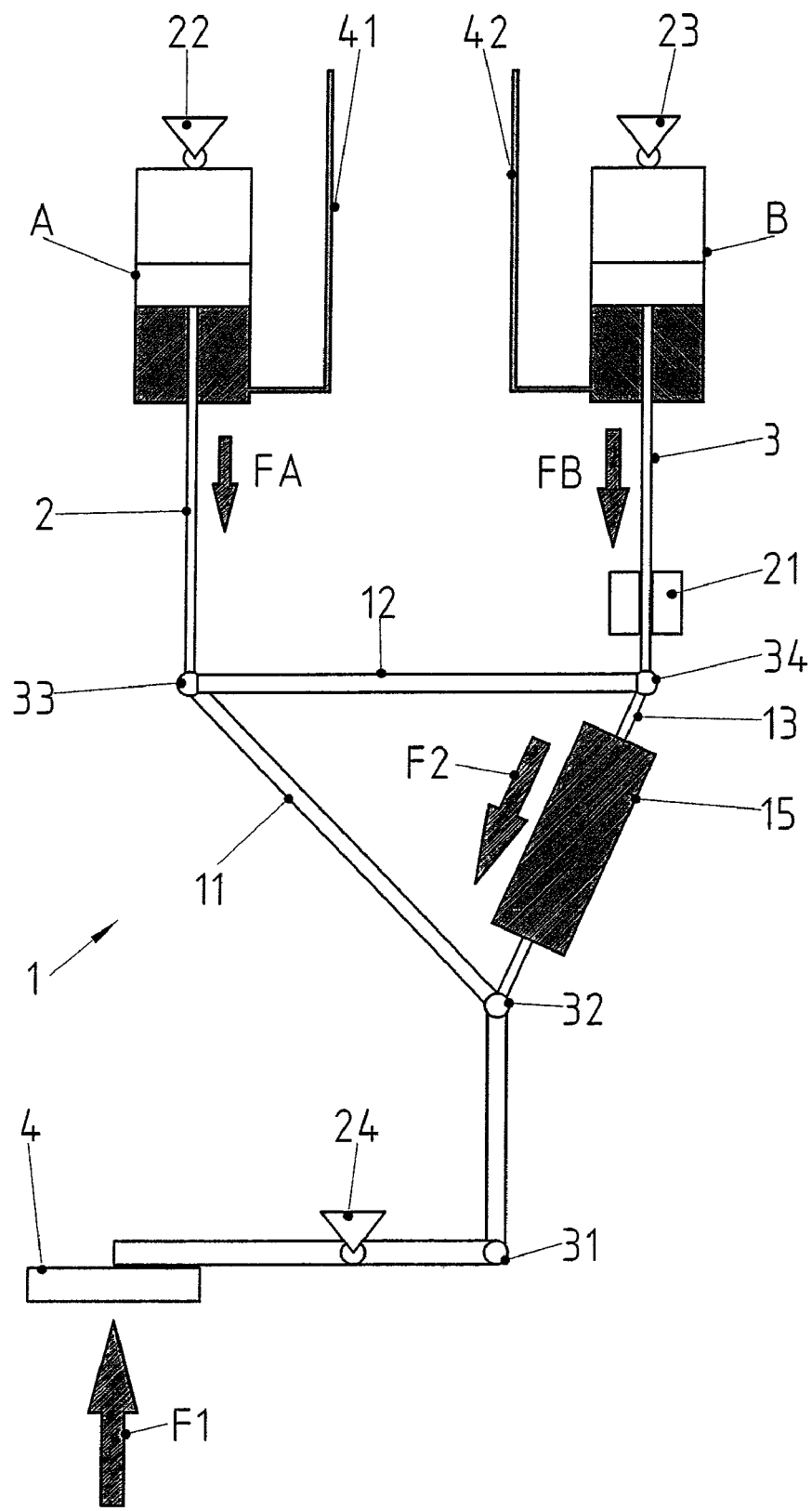
FIG. 1 is a schematic diagram of a first embodiment of the present invention in which the brake cylinders are pulled.

Identical elements in both embodiments are each provided with the same reference numbers in FIGS. 1 and 2 and will be described in the following commonly for both figures.

In this case, the brake power proportioning devices comprise a balance-beam-type device which is constructed as a triangle of forces designated generally by numeral 1. The force triangle of comprises legs 11, 12 and 13 and joints 32, 33 and 34. By way of joints 31 and 32 the force triangle is hinged to the brake pedal 4 which has an assigned point of support 24. Furthermore, the force triangle is hinged by the joints 33, 34 respectively by way of joint rods 2, 3 respectively to the respective wheel brake cylinders A B. Additional support points 21, 22 and 23 are provided for this purpose. The brake cylinders A, B operate via respective brake lines 41, 42.

At its leg 13, the triangle of forces 1 in each embodiment has an elastic element 15 which, under normal operating loads, has a defined and significant elasticity. When a brake control force F1 is applied to the brake pedal 4, a power transmission takes place by way of the force triangle 1 to the brake cylinders A, B. In this case, a force F2 acts upon the elastic element 15 causing a change of length of the elastic element 15. This results also in a change of length of the leg 13 of the triangle of forces 1, thereby leading to a change of length of the lever arms of the force triangle 1 for the transmission of the brake control force F1 to the brake cylinders A, B. Thus, the proportional brake control forces FA, FB (see solid arrows) exercised upon the brake cylinders A, B are a function of the deformation of the elastic element 15 and, as a function thereof, of the length of the leg 13 of the force triangle 1.

Figure 2:
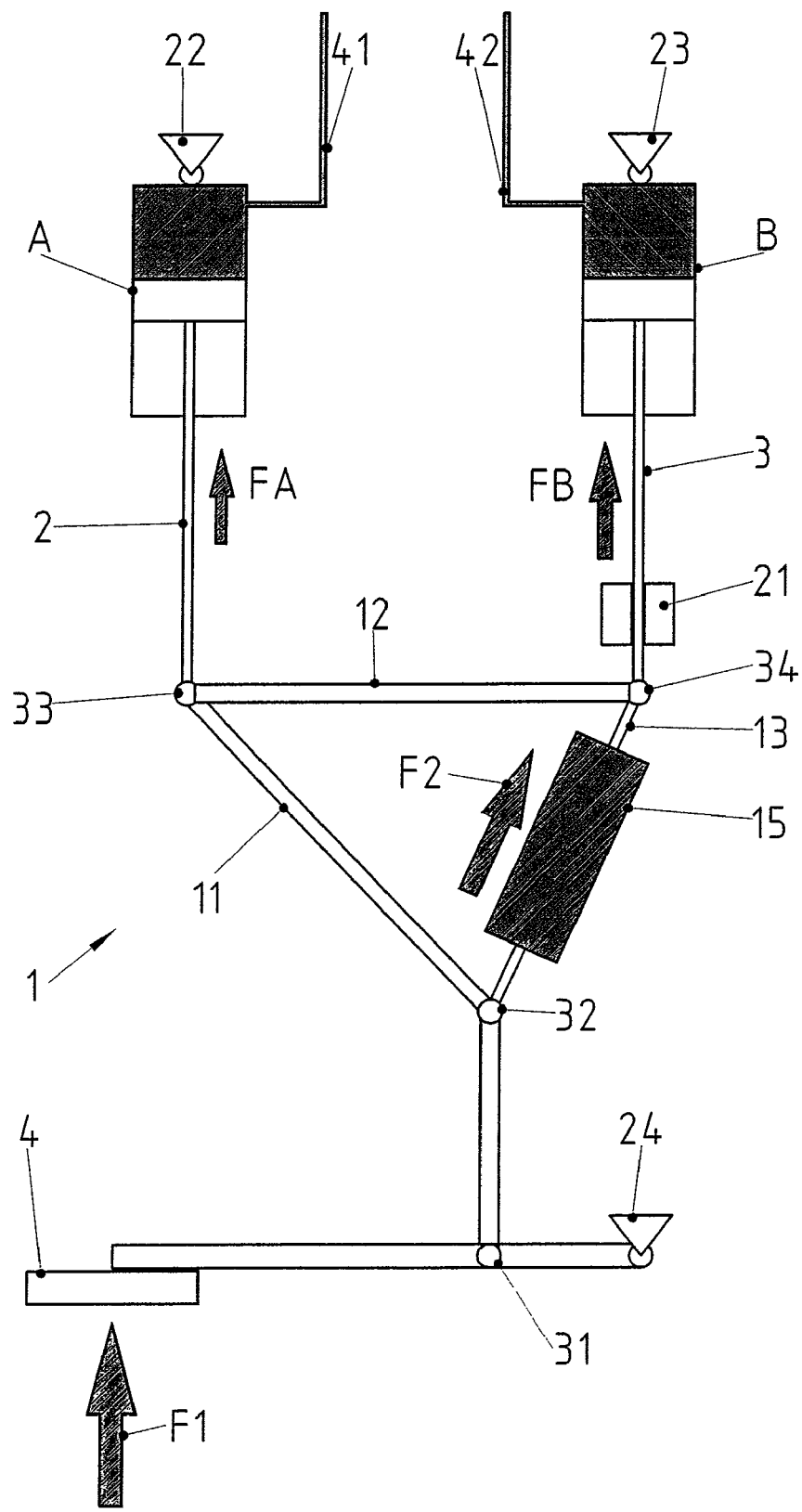
FIG. 2 is a schematic diagram of a second embodiment of the present invention in which the brake cylinders are pressed.

The difference between the two embodiments of FIGS. 1 and 2 resides in the fact that, in the first embodiment, the brake cylinders A, B are pulled, and in the second embodiment, they are pressed. Thus, in the embodiment of FIG. 1, the respective joint rods 2, 3 respectively hinged to the brake cylinders A, B have to be pulled for achieving a braking effect and have to be pressed in the FIG. 2 embodiment. The triangle of forces 1 therefore also has to be pulled or pressed, which results in different demands on the elastic element 15. In the first embodiment, the elastic element 15 therefore has to experience a change of length when under tension and in the second embodiment when subjected to pressure.

When, for example, in FIG. 1, the elastic element 15 experiences an expansion of length when under tension, as the brake control force F1 increases, the leg 13 of the triangle of forces becomes continuously longer. This causes a change of the ratio of the lever arms of the balance-beam-type device, because the length of the leg 11 remains constant. Thus, with an increasing brake control force F1, a continuously smaller proportion of this increase is transmitted to the brake cylinder B. In other words, the proportion of the brake control force F1 transmitted to the brake cylinder B at the start of the braking operation is greater than the proportion transmitted when the brake control force F1 is maximal. Or, stated differently, the ratio of the proportional brake control forces FB to FA is greater at the start of the braking operation than when the brake control is maximal. This results in a lever arm adjustment which continuously is a function of the brake control force, for a constant course of the proportioning of the brake control force upon the brake cylinders A,B. Thereby, when the brake cylinder B is assigned to the rear axle of the motor vehicle, the rear axle participates optimally in the deceleration of the vehicle from the beginning of the braking operation, resulting in a constantly optimally short braking distance.

The precise coordination takes place by a suitable selection of the leg lengths and angles of the triangle of forces as well as the "spring rigidity" of the elastic element 15. In this case, a plurality of additional combinations is also contemplated, particularly several elastic elements, and also on several legs as will be implementable now to one of ordinary skill in the art. Furthermore, as an alternative or in addition, elastic elements may be provided at adjacent legs with "opposite" elasticity (in the above example, therefore, an elastic element on leg 11 that experiences a shortening of the length under tension). It is understood that the above-mentioned characteristics can not only be used in the respectively indicated combination but also in other combinations or alone without departing from the scope of the present invention.

Summarizing, the invention provides a braking system that permits a constant course of the brake power proportioning as a continuous function of the brake control force onto several brake cylinders and thereby can have an arbitrary construction with respect to the pedal travel and its parameters, such as the idle path and the volume incorporation. In particular, it may have an ideally stiff construction in order to provide a particularly exact pressure point at the brake pedal 4. By using the elastic element 15, a constructively particularly simple construction is therefore obtained because no further restricted guiding devices are required. The coordination of the braking system can be represented by the elastic element 15. As a result, a desired brake power proportioning and operability can be achieved for arbitrary vehicle configurations. That is, the selection of the material and dimension of the braking system can be selected completely independently of the desired brake power proportioning. Furthermore, a constructive simplification can now be achieved by a lack of brake pedal deflecting or connecting levers that are fixed to the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake power proportioning device for proportioning a brake control force from a brake pedal to each of first and second brake cylinders, the first and second brake cylinders being provided respectively with first and second joint rods, each of the joint rods having an internal end movably disposed within the respective brake cylinder and an external end external of the respective brake cylinder, the brake power proportioning device comprising a first leg having an end hingedly connected to the external end of the first joint rod at a first joint, a second leg having an end hingedly connected to the external end of the second joint rod at a second joint and a third leg hingedly connecting the first and second joints, the first and second legs of the brake power proportioning device being hingedly connected to one another at a third joint spaced from the respective first and second joints, a link operatively connecting the third joint to the brake pedal, at least one of the first and second legs having an elastic element that is continuously deformable as a function of the brake control force applied to the brake pedal for adjusting lever arms between the third joint and the respective first and second joints as a function of the brake control force applied to the brake pedal.

2. The brake power proportioning device according to claim 1, wherein the elastic element is configured to operate under tension for controlled pulling of the joint rods.

3. The brake power proportioning device according to claim 1, wherein the elastic element is configured to operate under compression for controlled pressing of the joint rods.

4. The brake power proportioning device according to claim 1, further comprising a damping member associated with the elastic element.

5. A brake power proportioning device for proportioning a brake control force from a brake pedal to each of first and second brake cylinders, the first and second brake cylinders being provided respectively with first and second joint rods, each of the joint rods having an internal end movably disposed within the respective brake cylinder and an external end external of the respective brake cylinder, the brake power proportioning device comprising a first leg having an end hingedly connected to the external end of the first joint rod at a first joint, a second leg having an end hingedly connected to the external end of the second joint rod at a second joint and a third leg hingedly connecting the first and second joints, the first and second legs of the brake power proportioning device being hingedly connected to one another at a third joint spaced from the respective first and second joints, a link operatively connecting the third joint to the brake pedal, at least the second leg including an elastic element that is continuously deformable as a function of the brake control force applied to the brake pedal for varying a length of the second leg and thereby adjusting lever arms between the third joint and the respective first and second joints as a function of the brake control force applied to the brake pedal.

6. The brake power proportioning device according to claim 5, wherein the elastic element is configured to operate under tension for controlled pulling of the joint rods.

7. The brake power proportioning device according to claim 5, wherein the elastic element is configured to operate under compression for controlled pressing of the joint rods.

8. The brake power proportioning device according to claim 5, further comprising a damping member associated with the elastic element.

* * * * *